Figure 1:
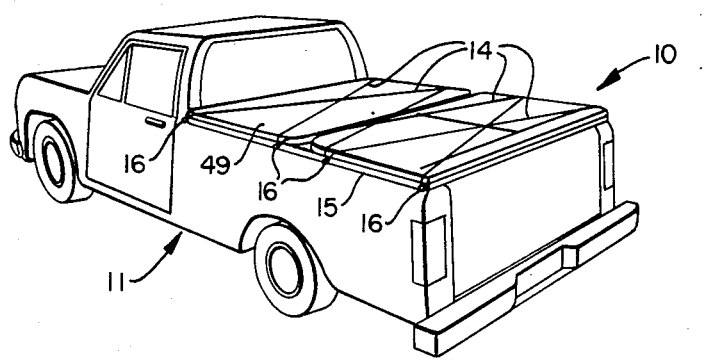

United States Patent [19]

Magnino

[11] Patent Number: 4,566,729
[45] Date of Patent: Jan. 28, 1986

[54] QUICK ERECTION TENT FOR PICKUP TRUCKS

[76] Inventor: Toney L. Magnino, 1821 Burning Tree La., Carrollton, Tex. 75006

[21] Appl. No.: 658,565

[22] Filed: Oct. 9, 1984

[51] Int. Cl.⁴ ............................................. B60P 3/32
[52] U.S. Cl. ..................... 296/159; 296/26; 296/27; 135/88
[58] Field of Search .................. 296/164, 26, 27, 107, 296/159; 135/88

[56] References Cited

U.S. PATENT DOCUMENTS

| | | | |
|---|---|---|---|
| 3,466,082 | 9/1969 | Branch | 296/27 |
| 3,773,379 | 11/1973 | Loisean | 296/107 |
| 4,294,484 | 10/1981 | Robertson | 296/164 |
| 4,310,194 | 1/1982 | Biller | 296/26 |
| 4,332,265 | 6/1982 | Baker | 296/159 |

*Primary Examiner*—Robert R. Song
*Attorney, Agent, or Firm*—Warren H. Kintzinger

[57] ABSTRACT

A quick erection tent with a base frame mountable on the tops of a truck bed sides and front walls erectable from a flat stowed state in a matter of some two-three minutes and return to the flat stowed state within the same time span. The base frame supports cots for two with storage space on the truck bed below the cots assessable through an opened tail gate. Further, the unit is quickly installed on a truck or removed from a truck with installation or removal requiring approximately ten minutes. Bolt assemblies extended through base frame edges engage inner down turned truck bed side and front wall top flanges without requiring drilled holes in truck bed wall top flanges.

20 Claims, 8 Drawing Figures

QUICK ERECTION TENT FOR PICKUP TRUCKS

This invention relates in general to protective shelter from weather, and more particularly, to a quick erection tent mountable above the truck bed of pickup trucks.

When one is out in the field either on work projects, on a fishing or hunting trip or just vacationing shelter from the weather is important particularly if the weather is bad, and if one is staying overnight or for days. Conventional tents erected on the ground provide some measure of protection but are subject to some problems in that the ground may be rough and hard to sleep on. Such tents are also subject to invasion by many different pests such as insects, rodents and animals. Almost everyone who has camped out to any extent at all has their stories to tell about encounters with various pests including animals, snakes, reptiles and insects some quite unpleasant if not at times dangerous. Then also when it rains water sometimes will flow into a tent on the ground. Obviously if a tent could be erected on a supporting structure above ground many of the problems encountered with tents erected on the ground would be eliminated and further in inclement weather it is important that tent shelter be erectable in a hurry to be able to get in out of the rain, sleet or snow. An excellent approach is applicant's quick erection tent for pickup trucks with a frame base that is also quickly mountable on the top of the truck bed side and front walls of a pick up truck. The quick erection tent is easily taken down to a flat stowed state and the truck bed is stil accessable for use beneath the tent structure by opening the truck tail gate.

It is therefore a principal object of this invention to provide a quick erection tent for pickup trucks.

Another object is to provide such a quick erection tent that is quickly and easily mountable and dismountable from above the bed of a pickup truck.

A further object is to provide such a tent that is useable up off the ground mounted on a truck.

Still another object is to provide such a tent that even though erected or in the stowed state on a pickup truck permits truck bed accessability below the frame of the tent by opening the truck bed tail gate.

Another object is to provide a tent structure that in the stowed state is an effective protective cover for the truck bed and anything carried in the truck below the stowed tent structure during truck travel.

Features of the invention useful in accomplishing the above objects include, in a quick erection tent for pickup trucks, a tent having a base frame mountable on and fastened to the tops of the truck bed side and front walls generally without requiring any modification of the truck such as drilling bolt holes. A part of the frame extends over the top of truck bed walls and bolt assemblies extended through base frame edges engage inner down turned truck bed side and front wall top flanges without requiring drilled holes in truck bed wall top flanges. Two bunks are removably nested in flanged bunk sections of the base frame. Front and rear "U" shaped tent erection brackets are pivotally mounted, respectively, to the front and rear of the base frame for pivotal movement between the erected state supporting the tent canvas enclosure and the folded down stowed state. The front "U" shaped tent erection bracket carries in its mid region a spacing bar having an end socket into which an additional spacing bar end is inserted. The additional spacing bar has a saddle bracket at its other end that is seated in place on the mid region of the rear "U" shaped tent erection bracket. This holds the front and rear "U" shaped tent erection brackets spaced apart against the resilient tension of erection tie cords in supporting the tent canvas fabric enclosure thereover. When the tent is in the collapsed stowed state on the truck criss-crossed tie down lines are employed across the tent structure as an aid to holding the structure properly in place on the truck.

A specific embodiment representing what is presently regarded as the best mode of carrying out the invention is illustrated in the accompanying drawings.

Figure 2:
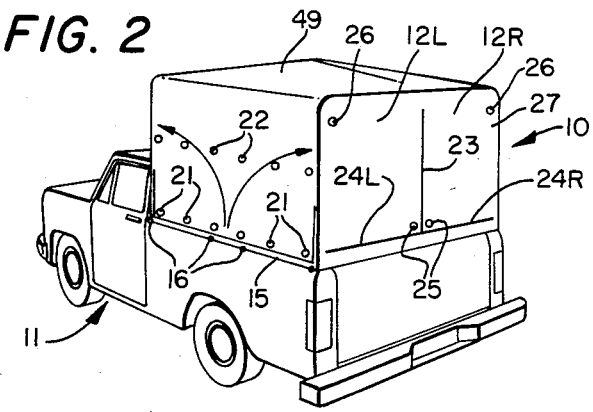
Figure 3:
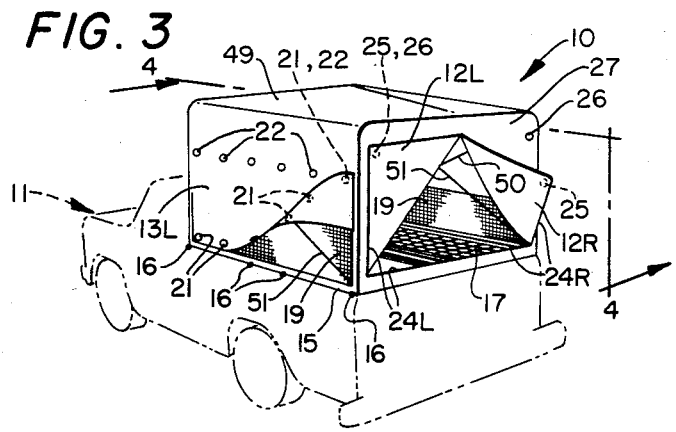
Figure 4:
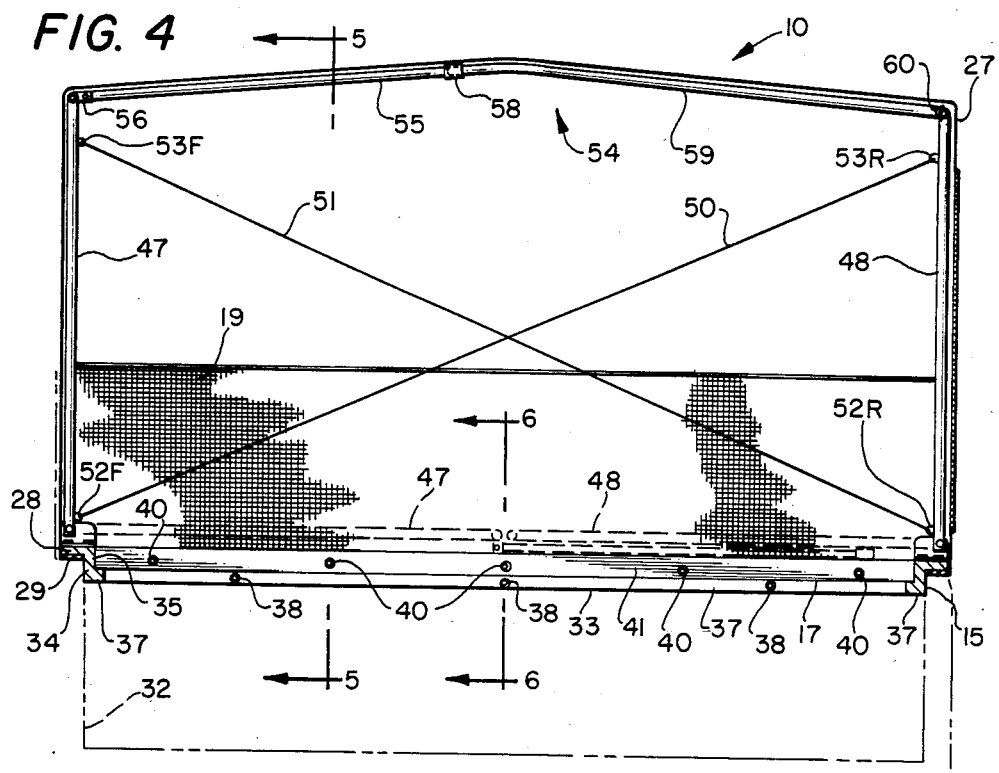
Figure 5:
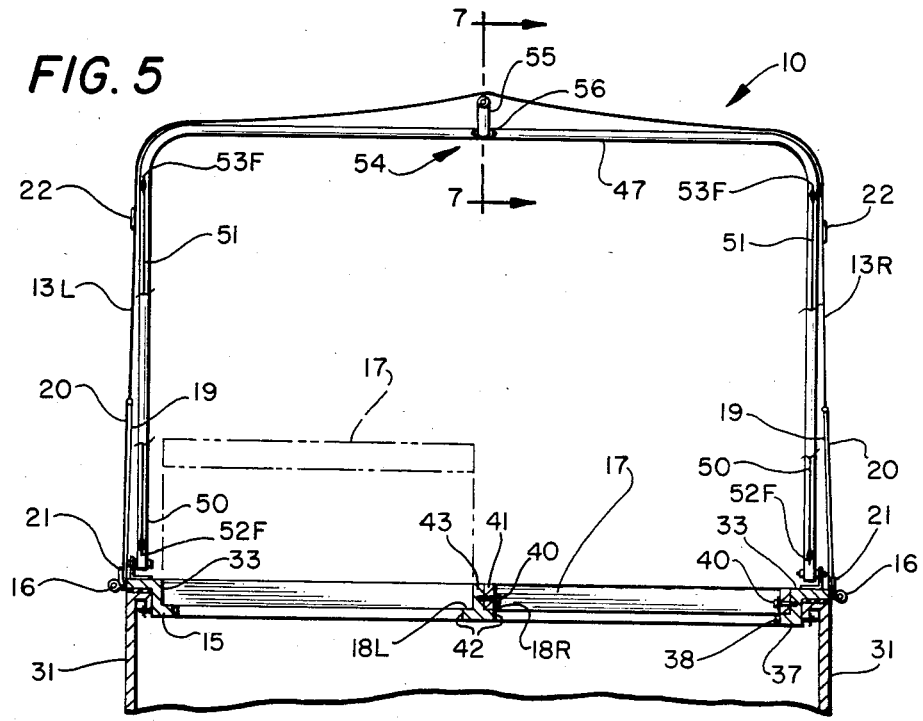
Figure 6:
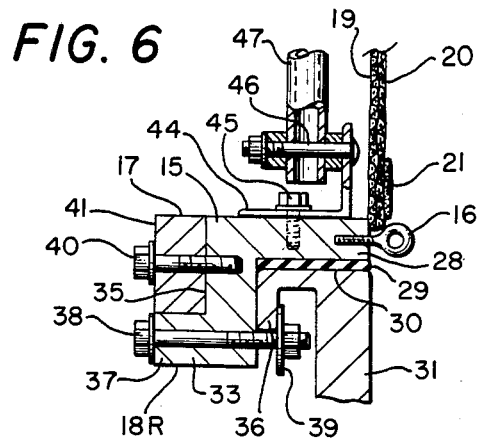
Figure 7:
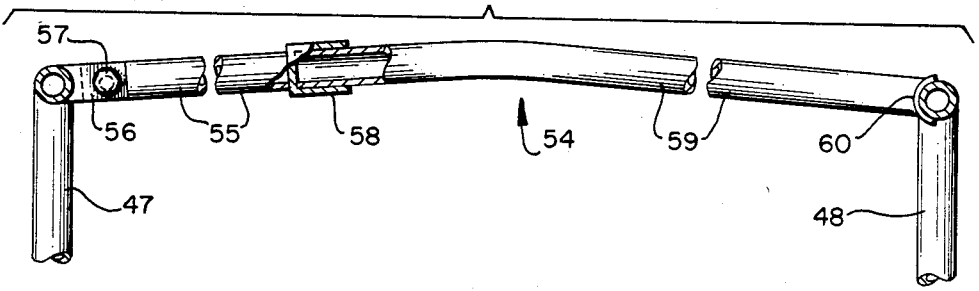
Figure 8:
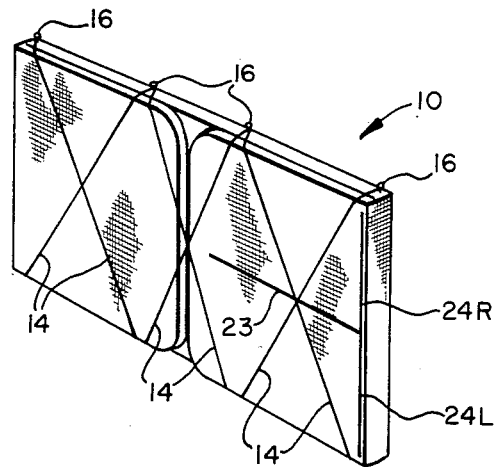

In the drawings:

FIG. 1 represents a perspective view of a pickup truck with a quick erection tent in the collapsed stowed state;

FIG. 2, a perspective view of a pickup truck with a quick erection tent in the erected state above the bed of a truck;

FIG. 3, a perspective view like FIG. 2 with, however, the pickup truck in phantom and tent entrance flaps lifted and a side partially lifted to show additional detail;

FIG. 4, a cut away and sectioned view taken generally along line 4—4 of FIG. 3 showing interior longitudinal detail of the pickup truck mounted tent;

FIG. 5, a transverse cut away and sectioned view taken generally along line 5—5 of FIG. 4 showing interior detail of the pickup mounted tent looking forward toward the front of the tent;

FIG. 6, a partial cut away and sectioned view taken generally along line 6—6 of FIG. 4 showing tent base frame mounting to truck bed side and front edge detail along with bunk mounting detail and "U" shaped bracket lower end pivotal mounting;

FIG. 7, a partial detail cut away and sectioned view taken generally along line 7—7 of FIG. 5 showing spacing bar assembly detail spacing the front and rear "U" shaped tent erection brackets apart; and FIG. 8, a perspective view of the quick erection tent in the collapsed stowable or shippable state.

Referring to the drawings:

Applicant's quick erection tent 10 for a pickup truck 11 is shown in the collapsed stowed state above the bed of a pickup truck in FIG. 1, in the erected state in FIG. 2, and in FIG. 3 with rear end entrance flaps 12L and 12R lifted along with side 13L partially lifted to show additional detail. While the quick erection tent 10 is shown on and discussed with reference to mounting on a pickup truck 11 it could be mounted on and used on a trailer carried on the tops of the trailer side and front walls of a trailer so equipped. When the tent is in the collapsed stowed state on a truck 11 as in FIG. 1 or dismounted from a truck as in FIG. 8 tie down ropes 14 are criss-crossed across the top between opposite side tent base frame 15 mounted tie down eyelet fittings 16. Two cots 17 may be used nested in cot retaining sections 18L and 18R of the tent base frame 15. Each of the tent sides 13L and 13R have a bottom screen ventilation panel 19 extended longitudinally the length thereof that are exposed for ventilation when the bottom flap 20 of sides 13L and 13R are snap fastened in the raised state with snap fastener elements 21 on the bottom of the flaps 20 and snap fastener elements 22 aligned on the upper portion of tent sides 13L and 13R. The entrance flaps 12L and 12R are provided with a vertical center zipper 23 and opposite side bottom zippers 24L and 24R that may be zipped open in order that the entrance flaps 12L and 12R may be raised and snapped in place. This is with the flap snap fastener elements 25 on the flaps brought into snapped engagement with the snap fastener elements 26 on the top outer corners of the tent rear wall 27.

Referring also to FIGS. 4, 5 and 6 the base frame 15 of the tent 10 has members along the sides and the front that have an "S" shaped configuration or the reverse thereof depending on the direction the sections are looked at with an upper flange 28 that, with a pad 29 (or gasket), sit on the top 30 of a truck bed side and front walls 31 and 32. The "S" shaped side members 33 and front member 34 have a downward depending wall 35 that extends down below the lower edge of truck bed side wall 31 and front wall 32 down turned flanges 36 and to a lower flange 37. Bolt assemblies 38 extend through the side members 33 and front member 34 to along with washer 39 grasp the truck wall flanges 36 to hold the tent 10 in place on the truck walls 31 and 32 without requiring drilled holes for mounting of the tent on the walls above a truck bed. When bunks 17 are nested in place screws (or bolts) 40 through bunk side rails 41 extended into side members 33 fasten the bunks 17 in place resting on the top of flanges 37 and also on flanges 42 of a longitudinally extending center bunk support inverted "T" shaped member 43 of tent base frame 15 that has bottom flanges 42 as part of cot 17 retaining sections 18L and 18R. Screws (or bolts) 40 are also used extending through bunk side rails 41 and into inverted "T" shaped member 43. The inverted "T" shaped member 43 of tent base frame 15 is fastened at opposite ends to opposite end members including front member 34 and a rear member of the base frame 15 that overlies but is not fastened to the top of the vehicle tail gate.

Brackets 44 are mounted on the top of base frame side members 33 by screws 45 (or bolts) at the front ends and the rear ends to provide pivot pin 46 pivotal mountings of front and rear inverted "U" shaped tent support brackets 47 and 48, respectively. Thus, these "U" shaped brackets 47 and 48 are pivotal from a collapsed stowed state to an erected state in supporting the fabric tent enclosure 49. The cross tie wires 50 and 51 (or ropes) each extend from a bottom bracket connection 52F and 52R at the interior front and rear, respectively, of the base frame side members 33 to connections 53R and 53F on the upper portion of each side of the "U" shaped brackets 47 and 48. A longitudinal spacing bar assembly 54 is provided for spacing the "U" shaped tent support brackets 47 and 48 including a front rod 55 pivotally mounted at the front in a center bracket 56 on "U" bracket 47 with a pivot pin 57 mounting in bracket 56. The front rod 55 of the spacing bar assembly is provided with a rod end receiving socket 58 at its rear end for receiving the front end of rear spacing rod 59, of spacing bar assembly 54, that has a saddle bracket 60 at its rear end for removable seating on the top middle of rear "U" shaped tent support bracket 48. Thus the longitudinal spacing bar assembly 54, where front rod 55 and rear spacing rod 59 are made from lengths of tubing, the "U" brackets 47 and 48 are held in spaced relation as indicated in FIGS. 2–5 and 7 by the spacing bar assembly 54 in cooperation with the cross tie wires 50 and 51 in holding the tent in the erected state supporting the fabric tent enclosure 49. In erecting the tent 10 from the collapsed stowed state of FIG. 1 after tie down ropes 14 are removed and zippers 23 and 24L and 24R opened for access to the interior of the fabric tent enclosure 49 rear spacing rod 59 that had been stored therein is grasped and then inserting the forward end thereof in socket 58 of front rod 55 and thrust forward to bring the forward "U" shaped bracket 47 to its upright position pivoting about its pivot mounting until restrained in position by cross tie wires 51. Then with rear "U" shaped bracket 48 pivoted to its upright position restrained by cross tie wires 50 and with some resilient stretching of both cross tie wires 50 and 51 the saddle bracket 60 may be snapped into system maintained seating engagement on the top middle of rear "U" shaped bracket 48.

This procedure is reversed to return the tent 10 to the collapsed stowed state. It should be noted that the bed of the pickup truck 11 (or of a trailer) is readily accessable beneath the tent 10 structure in either the erected state or collapsed stowed state merely by opening the tail gate 61. Further, tent 10 in either state on the pickup truck provides excellent protective cover for anything carried therebelow in the bed of the truck.

Whereas this invention has been described particularly with respect to a single embodiment thereof, it should be realized that various changes may be made without departure from the essential contributions to the art made by the teachings hereof.

I claim:

1. A quick erection tent mountable and useable above the bed of vehicles comprising: a quick erection tent with a base frame having opposite side frame members and opposite end frame members mountable on the tops of a vehicle bed side and front walls with the rear end frame member fastened to the rear ends of said opposite side frame members and spanning the space between said opposite side members and with storage beneath the tent structure accessable when a tail gate is open even with the tent mounted on the vehicle in both the erected state and collapsed flat stowed state; bolt and washer means extended through sides of said base frame engaging vehicle wall flanges for fastening said tent base in place on said vehicle; front and rear "U" shaped tent supporting brackets pivotally mounted on the front and rear of said tent base frame for pivotal movement from the folded down collapsed state to the vertical erected state for tent erection and return back to the folded down collapsed state to return the tent to the collapsed stowed state; spacer bar means pivotally connected to said front "U" shaped tent supporting bracket and having connection means for connection to said rear "U" shaped tent supporting bracket; flexible resiliently extendable front and rear cross tie means connected, respectively, from the rear of said base frame to the top portion of said front "U" shaped tent supporting bracket, and from the front of said base frame to the top portion of said rear "U" shaped tent supporting bracket; and a fabric tent enclosure supported by said "U" shaped tent supporting brackets in the tent erected state.

2. The quick erection tent of claim 1, wherein said base frame includes cot retaining means; a cot insertable into said cot retaining means; and fastening means for fastening said cot into said cot retaining means.

3. The quick erection tent of claim 2, wherein said base frame has a center longitudinal member fastened at opposite ends to said opposite end frame members; said cot retaining means includes said longitudinal member with retaining means on both sides of said center longitudinal member and on side frame members of said base frame for side by side cots.

4. The quick erection tent of claim 3, wherein said cot retaining means includes the opposite side frame members and said opposite end frame members; support flanges on said opposite side frame members and on said center longitudinal member; and a plurality of fastening members extended through sides of said cots and into frame members of said base frame.

5. The quick erection tent of claim 4, wherein said opposite side frame members and said opposite end frame members are in cross section of generally of "S" shape with an upper outwardly extended flange overlying, when installed above the bed of a vehicle, the tops of the vehicle bed side and front walls.

6. The quick erection tent of claim 4, wherein said opposite side frame members and the front end frame member of said opposite end frame members have a downward depending wall that depends lower from said upper flange than inner down turned wall flanges from the top of the vehicle bed side and front walls.

7. The quick erection tent of claim 6, wherein said support flanges on said frame members are lower inwardly directed flanges from the bottom portion of said downward depending wall.

8. The quick erection tent of claim 7, wherein said bolt and washer means extended through sides of said base frame are extended through said lower inwardly directed flanges to be tightened in place with the washers thereon tightened against and grasping the inner down turned vehicle wall flanges with the bolts clearing the bottom edges of said inner down turned vehicle wall flanges.

9. The quick erection tent of claim 8, wherein said spacer bar means pivotally connected to said front "U" shaped tent supporting bracket and having connection means for connection to said "U" shaped tent supporting bracket includes, a front rod pivotally mounted at the front to the middle of said front "U" shaped tent supporting bracket and having a socket at its rear end; a rear spacing rod insertable into said socket of said front rod, and having a saddle bracket at its rear end for removable seating on the top middle of the rear "U"-shaped tent support bracket.

10. The quick erection tent of claim 9, wherein said front and rear "U" shaped brackets are formed from metal tubing for adequate strength.

11. The quick erection tent of claim 10, wherein said front and rear "U" shaped brackets are pivotally mounted to fold back and forward, respectively, from the erected state to the folded down state and in reverse to the erected state.

12. The quick erection tent of claim 11, wherein said fabric tent enclosure has a top, opposite sides, a front panel and a back panel; and zipper means in said back panel for opening said tent back panel for erection and lowering said tent and for ingress and egress of people into and out of the tent.

13. The quick erection tent of claim 12, wherein said tent opposite sides are equipped with screen ventilation panels; and opposite side tent flap sections that are moveable from and lowered fastened down state to a raised fastened state to expose said screen ventilation panels for tent ventilation.

14. The quick erection tent of claim 13, wherein said flexible resiliently extendable front and rear cross tie means includes front and rear cross tie metal cables on each side of the tent inside said fabric tent enclosure.

15. The quick erection tent of claim 1, wherein said spacer bar means pivotally connected to said front "U" shaped tent supporting bracket and having connection means for connection to said "U" shaped tent supporting bracket includes, a front rod pivotally mounted at the front to the middle of said front "U" shaped tent supporting bracket and having a socket at its rear end; a rear spacing rod insertable into said socket of said front rod, and having a saddle bracket at its rear end for removable seating on the top middle of the rear "U" shaped tent support bracket.

16. The quick erection tent of claim 15, wherein said front and rear "U" shaped brackets are formed from metal tubing for adequate strength.

17. The quick erection tent of claim 16, wherein said front and rear "U" shaped brackets are pivotally mounted to fold back and forward, respectively.

18. The quick erection tent of claim 17, wherein said fabric tent enclosure has a top, opposite sides, a front panel and a back panel and zipper means in said back panel for opening said tent back panel for erection and lowering said tent and for ingress and egress of people into and out of the tent.

19. The quick erection tent of claim 18, wherein said tent opposite sides are equipped with screen ventilation panels; and opposite side tent flap sectons that are moveable from a lowered fastened down state to a raised fastened state to expose said screen ventilation panels for tent ventilation.

20. The quick erection tent of claim 19, wherein said flexible resiliently extendable front and rear cross tie means includes front and rear cross tie metal cables on each side of the tent inside said fabric tent enclosure.

* * * * *